United States Patent
Liu et al.

(10) Patent No.: US 12,216,758 B2
(45) Date of Patent: Feb. 4, 2025

(54) TRAINING DATA PROTECTION IN ARTIFICIAL INTELLIGENCE MODEL EXECUTION ENVIRONMENT

(71) Applicant: EMC IP Holding Company LLC, Hopkinton, MA (US)

(72) Inventors: Jinpeng Liu, Shanghai (CN); Michael Estrin, Austin, TX (US); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 495 days.

(21) Appl. No.: 17/352,653

(22) Filed: Jun. 21, 2021

(65) Prior Publication Data

US 2022/0405383 A1   Dec. 22, 2022

(51) Int. Cl.
*G06F 21/53*    (2013.01)
*G06N 3/04*    (2023.01)
*G06N 3/08*    (2023.01)

(52) U.S. Cl.
CPC ............ *G06F 21/53* (2013.01); *G06N 3/04* (2013.01); *G06N 3/08* (2013.01); *G06F 2221/033* (2013.01)

(58) Field of Classification Search
CPC .... G06F 21/53; G06F 21/602; G06F 21/6236; G06N 3/04; G06N 3/08
See application file for complete search history.

(56) References Cited

U.S. PATENT DOCUMENTS

| | | | |
|---|---|---|---|
| 11,443,049 B2* | 9/2022 | Tyagi | G06F 21/53 |
| 11,443,182 B2* | 9/2022 | Gu | G06N 3/063 |
| 11,573,828 B2* | 2/2023 | Kim | G06F 9/5016 |
| 11,676,011 B2* | 6/2023 | Linton | G06F 21/6236 |
| | | | 713/150 |
| 11,763,157 B2* | 9/2023 | Srinivasan | G06N 5/04 |
| | | | 706/15 |
| 2019/0392305 A1* | 12/2019 | Gu | G06F 21/53 |
| 2020/0082259 A1* | 3/2020 | Gu | G06N 3/08 |
| 2020/0082270 A1* | 3/2020 | Gu | G06N 3/045 |
| 2021/0049284 A1* | 2/2021 | Tyagi | G06F 21/629 |
| 2021/0049299 A1* | 2/2021 | Pacella | H04L 9/0897 |

(Continued)

OTHER PUBLICATIONS

Fan Mo et al, DarkneTZ: Towards Model Privacy at the Edge using Trusted Execution Environments, ACM (Year: 2020).*

(Continued)

*Primary Examiner* — Shanto Abedin
(74) *Attorney, Agent, or Firm* — Ryan, Mason & Lewis, LLP

(57) ABSTRACT

Techniques for training data protection in an artificial intelligence model execution environment are disclosed. For example, a method comprises executing a first portion of an artificial intelligence model within a trusted execution area of an information processing system and a second portion of the artificial intelligence model within an untrusted execution area of the information processing system, wherein data at least one of obtained and processed in the first portion of the artificial intelligence model is inaccessible to the second portion of the artificial intelligence model. Data obtained in the trusted execution area may comprise one or more data samples in an encrypted form usable to train the artificial intelligence model.

20 Claims, 6 Drawing Sheets

(56) References Cited

U.S. PATENT DOCUMENTS

2021/0112038 A1* 4/2021 Karame .................. G06N 3/08
2021/0125051 A1* 4/2021 Linton ................. G06F 21/602
2022/0197994 A1* 6/2022 Sternby ................. G06N 3/084
2022/0321647 A1* 10/2022 Berggren ................ H04W 8/22

OTHER PUBLICATIONS

D. Stutz, "Implementing Tensorflow Operations in C++—Including Gradients," https://davidstutz.de/implementing-tensorflow-operations-in-c-including-gradients/, Feb. 4, 2017, 14 pages.
Github, Inc. "Create an op," https://github.com/tensorflow/docs/blob/master/site/en/guide/create_op.md, Jul. 16, 2020, 30 pages.
Microsoft, "Microsoft SEAL," https://www.microsoft.com/en-us/research/project/microsoft-seal/, 2021, 4 pages.
FATE, "An Industrial Grade Federated Learning Framework," https://fate.fedai.org/, 2021, 5 pages.
Github, Inc. "Deep Learning with Intel SGX," https://github.com/landoxy/intel-sgx-deep-learning, Jan. 21, 2019, 4 pages.
Intel Corporation, "Intel® SGX SDK Developer Reference for Windows," Mar. 10, 2020, 461 pages.
Wikipedia, "Software Guard Extensions," https://en.wikipedia.org/w/index.php?title=Software_Guard_Extensions&oldid=1028673056, Jun. 15, 2021, 5 pages.
Wikipedia, "Trusted Execution Environment," https://en.wikipedia.org/w/index.php?title=Trusted_execution_environment&oldid=1027841774, Jun. 10, 2021, 7 pages.

* cited by examiner

400

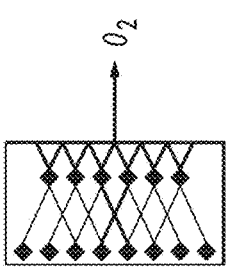
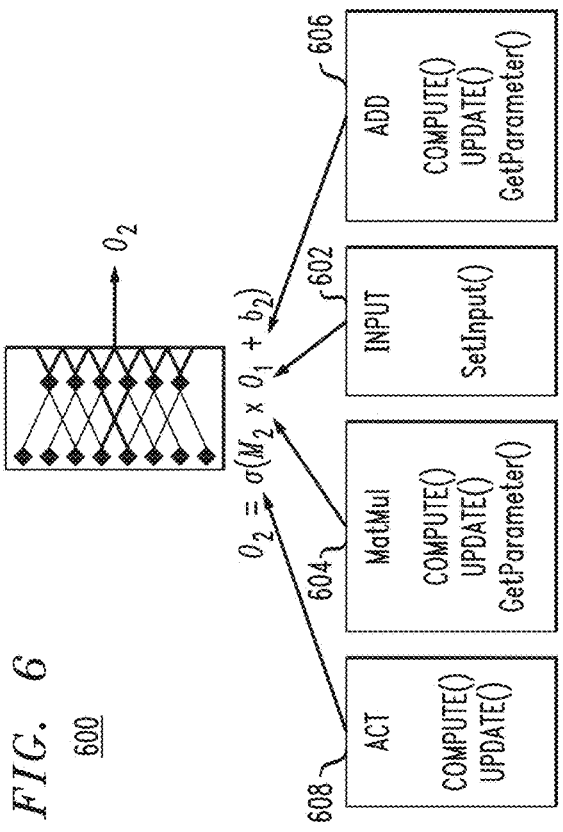
FIG. 6
600
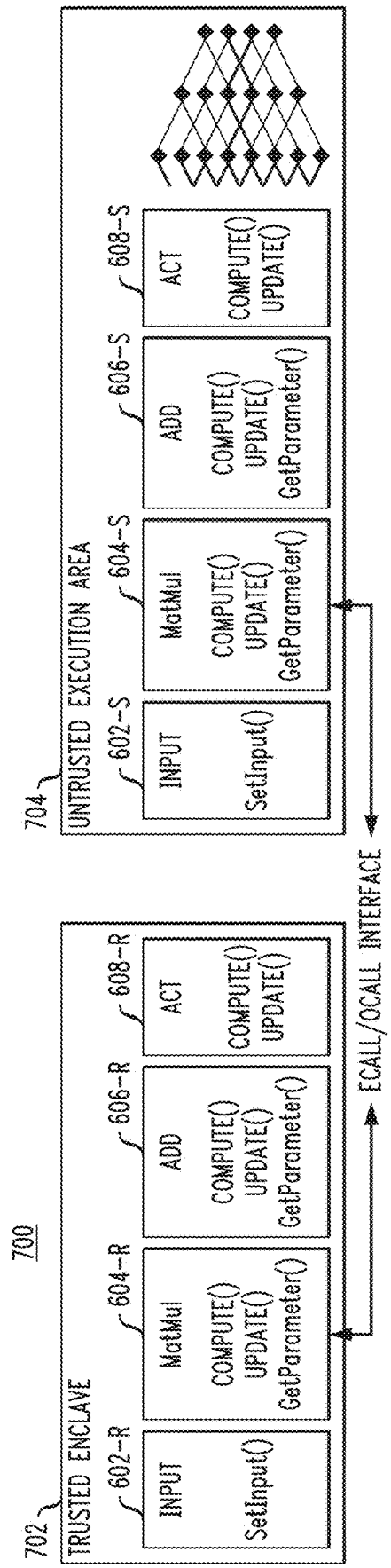
FIG. 7
700

800

900

TRAINING DATA PROTECTION IN ARTIFICIAL INTELLIGENCE MODEL EXECUTION ENVIRONMENT

FIELD

The field relates generally to information processing systems, and more particularly to artificial intelligence (AI) model management implemented in an information processing system.

BACKGROUND

When training an AI model, such as a deep learning model, as part of a given application program, it is beneficial to have real-world input data samples in the training data directly related to the application subject matter, e.g., financial information about a customer in a bank credit card application, medical data in an insurance application, or roadmap data from a foreign country in an auto-driving system. Typically though, such data contains sensitive information of the customer or a local jurisdiction and cannot be exposed due to privacy concerns and/or sanctioning policies. Therefore, training data samples often times need to be protected from direct access by application service providers (e.g., the auto-driving system operators) and/or third-parties.

SUMMARY

Embodiments provide techniques for training data protection in an artificial intelligence model execution environment.

According to one illustrative embodiment, a method comprises executing a first portion of an artificial intelligence model within a trusted execution area of an information processing system and a second portion of the artificial intelligence model within an untrusted execution area of the information processing system, wherein data at least one of obtained and processed in the first portion of the artificial intelligence model is inaccessible to the second portion of the artificial intelligence model.

Advantageously, in one or more illustrative embodiments, data obtained in the trusted execution area may comprise one or more data samples in an encrypted form usable to train the artificial intelligence model, as well as at least one secret useable to convert the one or more data samples into a decrypted form within the trusted execution area. Further, in one or more illustrative embodiments, a given operation executed by the information processing system may comprise one part executable in the trusted execution area and another part executable in the untrusted execution area, wherein the one part of the given operation has access to the data at least one of obtained and processed in the first portion of the artificial intelligence model, while the data is inaccessible to the other part of the given operation.

These and other features and advantages of embodiments described herein will become more apparent from the accompanying drawings and the following detailed description.

BRIEF DESCRIPTION OF THE DRAWINGS

FIG. 6 illustrates customized operations for use in computations associated with one or more layers of an artificial full connection neural network according to an illustrative embodiment.

FIG. 7 illustrates an implementation of customized operations according to an illustrative embodiment.

DETAILED DESCRIPTION

Figure 1:
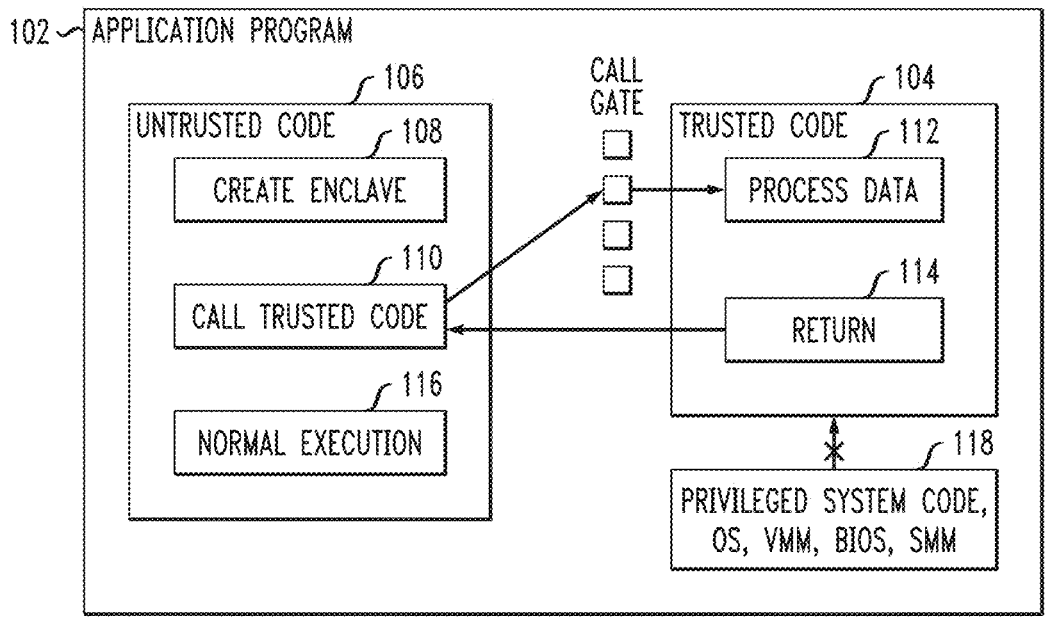
FIG. 1 illustrates an application execution environment with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." Other definitions, either explicit or implicit, may be included below.

It is realized that data is one of the most important assets of a company and, in many cases, constitutes the true business value of a company. With the rise of the so-called data economy, companies find enormous value in collecting, sharing, and using data. However, transparency in how businesses request consent, abide by their privacy policies, and manage the data that they have collected is vital to building trust and accountability with customers and partners who expect privacy.

Furthermore, some countries and organizations have regulations that data representing certain information specific to a particular jurisdiction or geographic area, e.g., native gene structures or local roadmap data, cannot be collected and accessed directly by foreign companies. Such regulations may greatly restrict prediction precision if a remote diagnosis or an auto-driving system is intended to provide service to local customers but without training an AI model with the local gene or roadmap data.

Assume, for example, that a company based in country A wants to develop an auto-driving system with the intent to operate the auto-driving system in markets of county B and to train the system using local roadmap data of country B.

However, further assume that security regulation policies of country B restrict collection and/or access of local roadmap data outside country B, and thus company A cannot collect or directly access the roadmap information itself. So company A finds a local company in country B to serve as an intermediary between itself and a governmental agency of country B, and thus to collect the roadmap information. The problem now is that company A needs a solution to assure the governmental agency that it cannot directly access the local roadmap information and, at the same time, use this roadmap information to train its auto-driving system.

In order to attempt to protect data samples for training an AI model, such as a deep learning model based on an artificial full connection neural network, from being directly accessed by application service providers (e.g., the auto-driving system operators such as company A in the above scenario) and/or third-parties, various existing solutions have been proposed. For example, in one existing solution, homomorphic encryption is used such that the deep learning computations are directly executing on the encrypted data. Multi-party federate learning is used in another existing solution to protect raw data from other raw data. In yet another existing solution, the entire model is placed in a trusted execution environment (TEE) and trained therein. However, each of these existing solutions have their own drawbacks.

There are several third-party libraries that support full homomorphic encryption. Theoretically, with these libraries, sample data can be collected by local authorities and encrypted with a homomorphic encryption algorithm. The encrypted data can then be provided to the application operators for use in training, for example, a medical diagnosis AI model or an auto-driving AI model. After training, model parameters are sent to the local authorities to be decrypted with the encryption key and the decrypted parameters can be returned to the application operators. In this way, the model of the application operators can be trained with the local data without losing the confidentiality of the local data samples. However, this solution has several drawbacks. First, the overhead of homomorphic encryption is prohibitively heavy for practical uses. This is especially the case for a deep AI model with several TB (terabytes) of parameters wherein performance, due to the burdensome overhead, would be unacceptable. Further, to date, no homomorphic encryption library can support accelerators. Thus, graphic processing units (GPUs) or tensor processing units (TPUs) cannot be used to train an AI model in conjunction with homomorphically-encrypted data.

Multi-party federate learning frameworks have been proposed. However, these frameworks are mostly focused on how to exchange data between multiple parties without exposing raw data to each other and how to integrate features extracted from the data from each party into training models. Currently, such frameworks are very complex with many predefined restrictions on computing/networking infrastructure (to exchange and collaborate on data among multiple parties) and the deep learning model (to integrate the data from multiple parties into the deep learning model), and cannot be adapted for practical use.

Turning now to the TEE solution, details of an existing framework will be explained prior to describing some drawbacks. Illustrative embodiments are directed to a TEE-based solution for providing training data protection in an artificial intelligence model execution environment. One illustrative TEE framework described herein is the Software Guard Extension (SGX) TEE platform available from Intel Corporation. However, it is to be appreciated that illustrative embodiments are not limited to implementation with the SGX TEE platform but rather are more generally applicable to other AI model and application execution environments.

The SGX platform has hardware-assisted functionality to provide a trusted execution environment used by applications to populate protected user code and data inside "enclaves" or trusted execution areas. Once activated, the trusted hardware platform protects enclave code and data from outside access and modification. More particularly, an enclave is used to protect code and/or data from access and modification by other parties, for example, the operating system/hypervisor itself or other applications.

Furthermore, the SGX platform utilizes an attestation service that authenticates software provided by the customer to be loaded into the enclave. The attestation service attempts to ensure that the lower layer hardware platform can be trusted, for example, that the central processing unit (CPU) is a genuine product manufactured by a given vendor and that the firmware and microcode is secure without being tampered with by a malicious third-party. Further, the attestation service attempts to ensure application software (code/data) can be trusted, i.e., that code/data of the software has not been tampered with or modified by other malicious parties. Still further, the attestation service attempts to ensure that the software installation process can be trusted, i.e., the software is installed onto the platform exactly as defined without being changed or tampered with by other malicious parties. When these three aspects can be trusted, the customer will be assured that their applications are secure and cannot be exploited.

Still further, the SGX platform utilizes a provisioning service to provide confidentiality to the software by provisioning secrets and sensitive data to the enclave during runtime. After the software is attested (authenticated) by the customer, the customer can be assured that everything about the application, hardware and software, is secured, and they can then provision their secrets and sensitive data to the application running inside the enclave. Other services such as sealing, migration, and revocation construct a closed loop to consolidate the security of the application running inside the enclave.

FIG. 1 illustrates an application execution environment 100 wherein a given application program is executed in a trusted part inside a trusted part (e.g., SGX enclave in a trusted execution environment or TEE platform) and an untrusted part (e.g., outside the SGX enclave). More particularly, as shown, application program 102 has trusted code 104 and untrusted code 106. Untrusted code 106 creates an enclave in step 108 with the code/data provided by the customer. The trusted code 104 and the untrusted code 106 communicate with each other using ECALL (i.e., a call from outside the enclave to the enclave using predefined call gates) and OCALL (i.e., a call from the enclave to outside the enclave). There is no other way to call the services inside an enclave other than through the predefined call gates. For example, as shown, untrusted code 106 calls trusted code 104 in step 110 via one of the call gates. With the call gates being predefined and under stacks being checked, third-parties cannot tamper with the enclave during runtime, for example, with stack overflow attacks. In step 112, the enclave processes data and returns the process results to untrusted code 106 in step 114. Untrusted code 106 performs normal execution on the process results and/or other data in step 116. Note that, due to use of the enclave in trusted code 104, access and modification of code/data therein by other parties and applications 118 (e.g., privileged system code, operating system (OS), virtual machine monitor (VMM), basic input-output system (BIOS), system management mode (SMM), etc.) is not possible.

Figure 2:
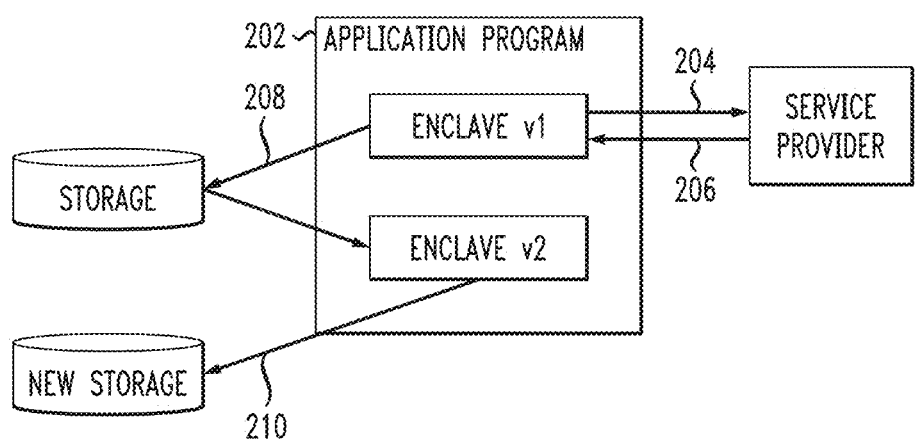
FIG. 2 illustrates an exemplary workflow in an application execution environment with which one or more illustrative embodiments can be implemented.

FIG. 2 illustrates an exemplary enclave-based TEE platform workflow 200. As shown, in step 202, the TEE platform installs an enclave (enclave v1) and measures the code/data contents and the installation process. In step 204, enclave v1 is remote attested by the data owner service provider and, in step 206, the data owner service provider provisions data to the attested enclave (enclave v1). In step 208, the enclave seals (stores) the data for future usage. The data is encrypted with a key unique to the TEE platform and enclave. After a security upgrade, a new enclave (enclave v2) reads the encrypted data back and seals (stores) the data with a new key in step 210. It is evident from FIG. 2 that, because the software (code and data) is loaded into the enclave in the enclave initialization process, the enclave can only provide authenticity of the software, but not confidentiality. To achieve confidentiality, the data must be provisioned during runtime (step 206) after attestation (step 204) by the customer via a secure channel established with the keys created during the attestation process (not expressly shown in FIG. 2). Further note that the data cannot be built into the enclave software statically, but are provided by the service provider during runtime dynamically. While the existing enclave-based TEE platform enhances security, the performance of an application is degraded while executing inside an enclave as compared with executing outside the enclave.

It is further realized herein that to enable end-users to extend their deep learning frameworks, each current framework, for example, TensorFlow, PyTorch, PlaidML, and TVM, has programming interfaces to enable programmers to customize deep learning network operators (OP hereafter) and integrate them into the framework so that the customized OPs can work the same way with the built-in operators provided by the framework itself. For example, TensorFlow has defined the interfaces on how to customize an OP. In one or more illustrative embodiments, it is assumed that the following interfaces are provided by the framework to customize an OP:

(i) Register interface: registers the customized OP into the framework;

(ii) SetInput interface: assigns values to the input parameters (for example, Matrix $A_i$ and bias $b_1$) of the customized OP;

(iii) Compute interface: executes the computation of the OP during the feedforward pass;

(iv) Update interface: calculates the gradients and updates the parameters accordingly during the backpropagation pass; and (v) GetParameter interface: exports the parameters of the OP from a trained model into an inference model.

If an interface is not supported or defined by the framework, interface implementation logic can be added into the deep learning program to complete the job defined in the unsupported interface, without changing the framework codebase.

In the context of an enclave-based TEE platform, e.g., SGX, there have been proposals to migrate all model layers from the untrusted part into the enclave by providing an application programming interface (API), e.g., the landoxy open-source project. However, it is realized herein that a solution that attempts to run the entire AI model inside the enclave has many drawbacks. Currently, the enclave-based TEE platform cannot support every layer type inside an enclave due to restricted runtime support of the enclave. Further, the total resources in a platform that can be used by enclaves are limited (e.g., 128 Megabytes in SGX1 and 2 Terabytes in SGX2). So it is not feasible to accommodate a large model inside an enclave, especially if there are multiple enclaves running simultaneously inside the same platform. Still further, the performance penalty of running a large deep learning model inside the enclave is unacceptable and accelerators outside the enclave cannot be leveraged.

Illustrative embodiments overcome the above and other drawbacks by providing solutions that protect data samples, in the context of a trusted execution environment-based platform, from direct access, and use customized operators supported by deep learning frameworks to exchange intermediate data between the outside world and the platform. Such solutions have many advantages, as will be explained, and can be easily integrated into deep learning frameworks to utilize accelerators (GPU, TPU, etc.) and protect customer privacy and their sensitive data.

Figure 3:
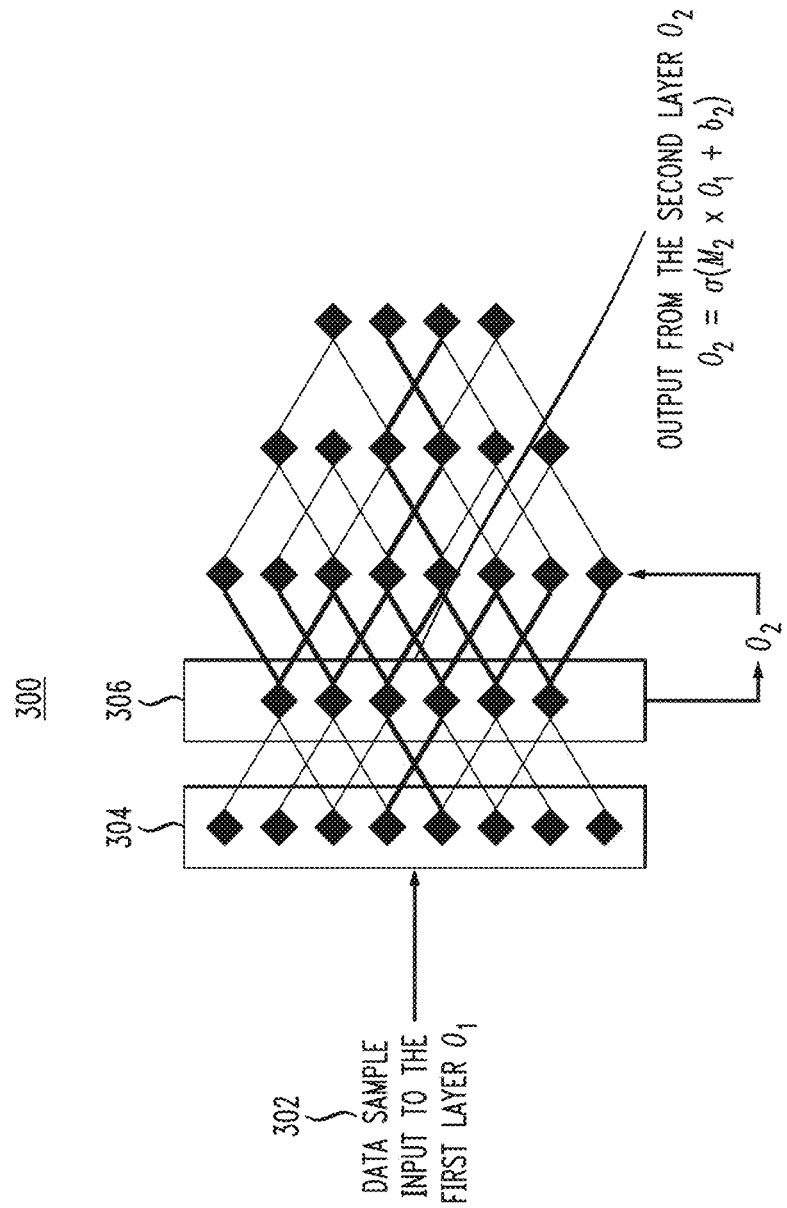
FIG. 3 illustrates an artificial full connection neural network associated with an artificial intelligence model with which one or more illustrative embodiments can be implemented.

More particularly, illustrative embodiments realize that, to protect input data samples, it is not necessary to protect the entire AI model. For example, consider FIG. 3 which illustrates an AI model in the form of an artificial full connection neural network 300. Assume a goal is to protect data sample 302, which serves as the input to the first layer 304 of the network which outputs $O_1$. Note that $O_1$ is used only in the computation inside second layer 306 whose output is defined as $O_2=\sigma(M_2 \times O_1+b_2)$ wherein $M_2$ and $b_2$ are the model parameters of the second layer 306. The third layer (and layers thereafter) can only see the second layer output $O_2$, and have no knowledge of the first layer output $O_1$, the data samples 302 input to first layer 304.

From the observations above, it is realized that if $O_1$ is unknown to the outside world and if both $M_2$ and $b_2$ are also unknown to the outside world, then it can be concluded that, just from $O_2$, the outside world cannot deduce the values of $O_1$. This is at least because in equation $O_2=\sigma(M_2 \times O_1+b_2)$, there are three unknown variables: $O_1$, $M_2$, and $b_2$, and they are unknowns with high-dimension tensors or vectors.

Accordingly, illustrative embodiments provide for executing a portion (i.e., a first sub-model) of the AI model in an enclave (i.e., in the trusted part of the TEE platform) and another portion and/or remainder (i.e., a second sub-model) of the AI model outside the enclave (i.e., in the untrusted part of the TEE platform). This is illustrated in execution environment 400 of FIG. 4 wherein the two sub-models are shown respectively placed in a trusted execution area 402 and an untrusted execution area 404 according to an illustrative embodiment.

More particularly, as shown, (one or more) data samples are encrypted by a data owner service provider 410 (e.g., a local authority in the auto-driving system scenario described above). The data samples can only be accessed inside trusted execution area 402 (e.g., trusted enclave). After attesting the enclave, data owner service provider 410 provisions the secrets to the enclave. The encrypted data samples then can be decrypted as the clear-text input to the network. Since this occurs inside the enclave, the output $O_1$ of first layer 406 is unknown outside the enclave. The model parameters $M_2$ and $b_2$ of the second layer 408 are also unknown outside the enclave because they are initialized with random numbers inside the enclave and cannot be accessed from outside the enclave. Only the output $O_2$ of the second layer 408 is visible outside the enclave and is passed from the enclave as an input to a third layer 409. Accordingly, illustrative embodiments protect the data samples from direct access from application operators.

For some cases, if the second layer 408 parameters $M_2$ and $b_2$ are initialized from the parameters of the previous model in a sequential model, without being initialized with random numbers, the parameters $M_2$ and $b_2$ will be visible outside the enclave and then data sample 01 cannot be protected. In such cases, illustrative embodiments find the first layer where its parameters are not initialized with predefined values and place this layer and all its previous layers into the enclave, and from the output of this layer, the data sample cannot be deduced. It is possible to always identify such a layer as only a limited number of layers in a model are initialized with pre-defined values from other models.

Figure 5:
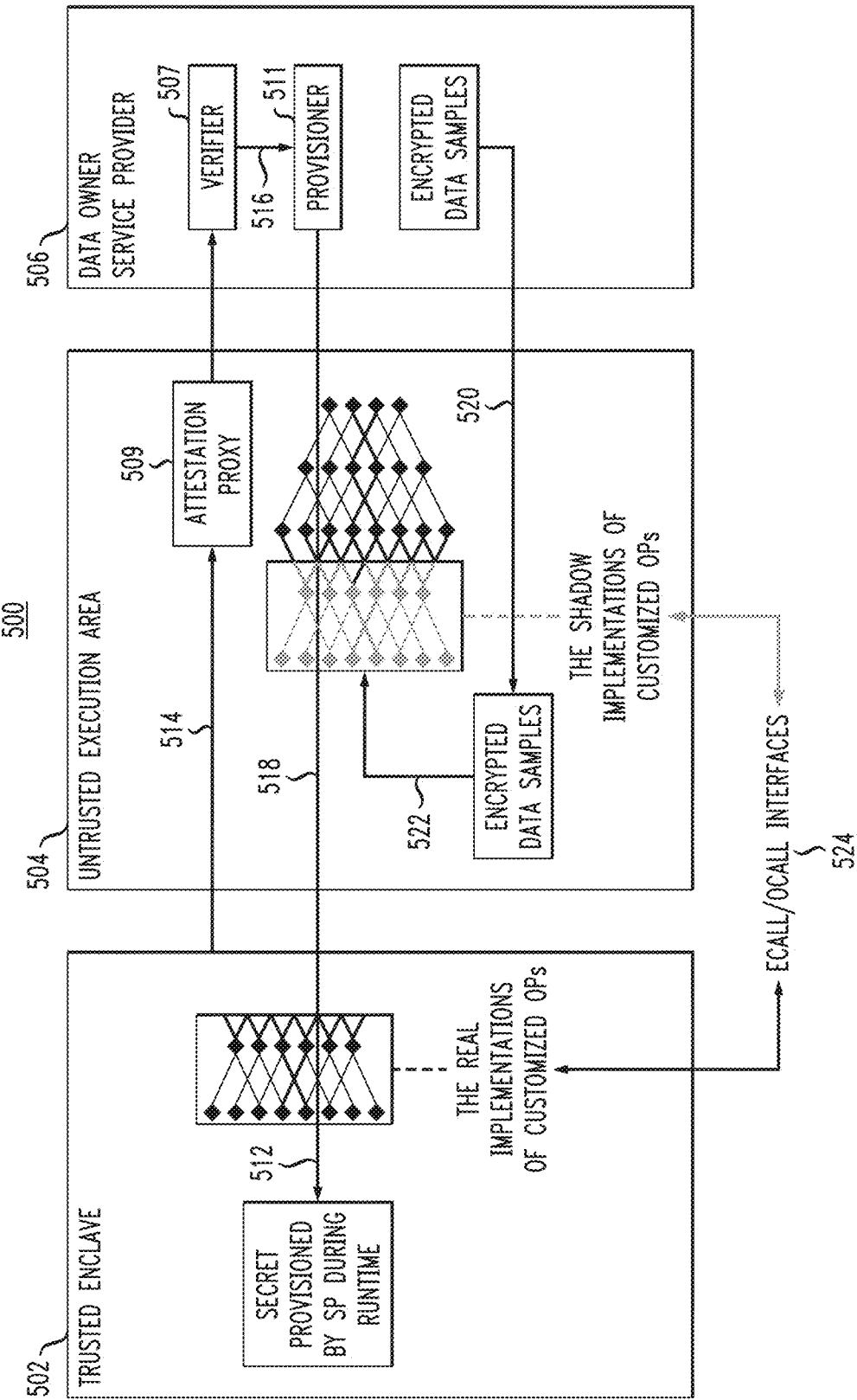
FIG. 5 illustrates a trusted execution environment workflow for protecting input data samples of an artificial intelligence model according to an illustrative embodiment.

FIG. 5 illustrates a trusted execution environment workflow 500 for protecting input data samples of an artificial intelligence model according to an illustrative embodiment. As shown, the environment in which workflow 500 is executed comprises a trusted enclave 502 (trusted execution area) and an untrusted execution area 504 (referred to herein as outside the trusted enclave or the outside world).

More particularly, in step 512, data owner service provider 506 deploys trusted enclave 502, which contains real implementations of customized operations (OPs) of the trusted sub-model in which the last layer has the nonvisible parameters, into the remote TEE platform. After deployment, a verifier module 507 of data owner service provider 506 sends an attestation challenge to trusted enclave 502 relayed by an attestation proxy module 509 located in untrusted execution area 504. In step 514, trusted enclave 502 sends an attestation report relayed by the attestation proxy module 509 to the verifier module 507.

After attestation, in step 516, the verifier module 507 forwards a local key created during the attestation process to a provisioner module 511 located in data owner service provider 506. Provisioner module 511 provisions one or more secrets to trusted enclave 502 in step 518. Such secrets are used to decrypt the encrypted data samples provided by the data owner service provider 506. Data owner service provider 506 transmits the encrypted data samples to the untrusted execution area 504 in step 520. In step 522, the encrypted data samples are fed to the deep learning model to be used to train the model, which is provided by an application operator. The shadow implementations of the customized OPs in untrusted execution area 504 interact in step 524 with the real implementations of the customized OPs in trusted enclave 502, using ECALL/OCALL interfaces as described above, to execute the computations defined by the customized OPs, which will be further described in detail below.

Referring back to the use case mentioned above, recall that a company based in country A develops an auto-driving system which is to be operated in county B and trained using local roadmap data of country B, but that country B restricts collection and/or access of local roadmap data outside country B. Thus, company A finds a local company in country B to serve as an intermediary to collect the roadmap information. In accordance with illustrative embodiments, company A defines the sub-model in the untrusted execution area (e.g., 504), and its responsibility to protect data in this this untrusted part (e.g., model, algorithms, parameters, etc.) which can be the same or similar to any other deep learning training in a public cloud computing platform. The local company B collects the local roadmap information and encrypts it with the local key known only to itself. Company A can download the encrypted dataset but cannot decrypt it because it does not have the key. The trusted part of the application to be executed inside the enclave (e.g., 502) can be provided by company A, the local delegation company B or another third-party independent software vendor (ISV) in clear-text. Company A evaluates the enclave to make sure it works properly so that the model can be trained correctly. Company B evaluates the enclave to make sure the data samples (roadmap information) are well-protected by encryption and cannot be accessed by company A or any third-party, for example, an actor with malicious intent.

Company A deploys the application (trusted enclave sub-model part and the untrusted sub-model part) into the platform (which can be cloud-based) and launches a software attestation. Company B verifies that the trusted enclave and its installation process are the same as the version it has evaluated without being tampered with by validating a software measure signed by a hardware certificate. Company B then establishes a secure channel to the trusted enclave with the key pairs created during the attestation process to provision the decryption key to the trusted enclave. Lastly, the trusted enclave uses the key to decrypt the dataset, however, the decrypted clear-text dataset is not visible to the outside world including the untrusted part in the same application.

Figure 4:
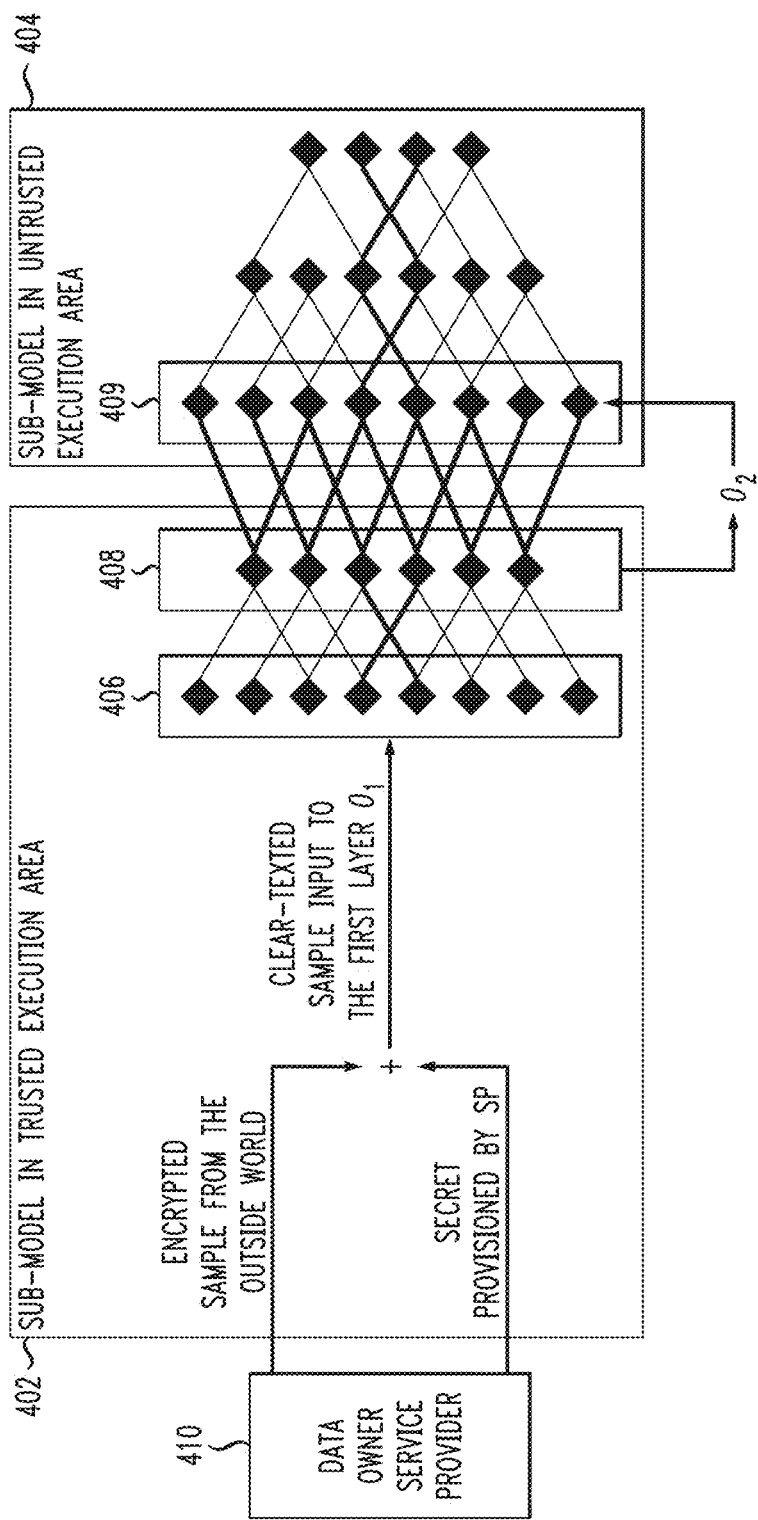
FIG. 4 illustrates separation of an artificial full connection neural network into sub-models respectively executing in a trusted execution area and untrusted execution area according to an illustrative embodiment.

Referring now to FIG. 6, customized operations (OPs) for layers of an artificial full connection neural network according to an illustrative embodiment are depicted. Note that the network in FIG. 4 is used as an example here in FIG. 6, and it is assumed that the first and the second layers of the model are put into the trusted enclave. Thus, for the first and the second layers, illustrative embodiments provide a set of customized OPs 600 as shown in FIG. 6.

The set of customized OPs 600 comprises an input operation (Input OP) 602, a matrix multiply operation (MatMul OP) 604, an addition operation (Add OP) 606 and an activation operation (Act OP) 608. Each of the customized OPS utilizes one or more built-in operator interfaces provided by the deep learning framework used to train and execute the AI model, for example, but not limited to TensorFlow.

Input OP 602 is a customized operation associated with the operand 01 to assign the data sample vector into the first layer. There are no model parameters attached to this operation, so the SetInput( ) interface is sufficient.

MatMul OP 604 is a customized operation associated with the $M_2 \times O_1$ and comprises the Compute( ) interface to compute the $M_2 \times O_1$ during a feedforward pass, the Update( ) interface to update $M_2$ according to the gradient during a backpropagation pass, and the GetParameter( ) interface to export $M_2$ from the trained model into the inference model. There is no need to define the SetInputO interface for this operation since it receives its input directly from the memory inside the trusted enclave. Add OP 606 is a customized operation associated with the +operator and comprises the Compute( ) interface to compute the +operation during a feedforward pass, the Update( ) interface to update $b_2$ according to the gradient during a backpropagation pass, and the GetParameter( ) interface to export $b_2$ from the trained model into the inference model. There is no need to define the SetInput( ) interface for this operation since it receives its input directly from the memory inside the trusted enclave.

Act OP 608 is a customized operation associated with the a operator and comprises the Compute( ) interface to compute an activation function during a feedforward pass and the Update( ) interface to pass its gradient to Add OP 606 during the backpropagation pass. There is no parameter attached to this operation so there is no need to define the GetParameter( ) interface. Further, there is no need to define the SetInput( ) interface for this operation since it receives its input directly from the memory inside the trusted enclave.

FIG. 7 illustrates an optimized implementation 700 of the set of customized operations 600 (i.e., Input OP 602, MatMul OP 604, Add OP 606 and Act OP 608) from FIG. 6 in a TEE platform with a trusted enclave 702 and an untrusted execution area 704 as explained above. In this illustrative embodiment, each customized operation is implemented in two parts: a shadow part (denoted as -S, i.e., 602-S, 604-S, 606-S and 608-S) inside the untrusted execution area 704 and a real part (denoted as -R, i.e., 602-R, 604-R, 606-R and 608-R) inside the trusted enclave 702. The phrase "shadow" as illustratively used herein denotes that this part of the operation does not actually access the clear-text (unencrypted) data samples that are intended to be protected since the shadow part of the computation is in the untrusted execution area, but rather it is the "real" part of the computation that actually accesses the clear-text data samples since the real part of the computation is in the trusted enclave.

For example, note that when the framework calls the SetInput( ) interface of the Input OP 602 with the encrypted data sample as the input parameter, the shadow implementation (602-S) of this interface calls the real implementation (602-R) of the SetInput( ) interface of the Input OP 602 via the ECALL interface and forwards the encrypted data sample as input. The real implementation (602-R) inside the trusted enclave 702 decrypts the encrypted data sample with the key provided by the provisioning service described above, then assign this decrypted data sample to $O_1$.

After that, $O_1$ will have the clear-text of data sample so that it can be used directly by the program without harming the correctness of the computations in the training model. As long as it is kept inside trusted enclave 702, the data sample is safe. However, the data sample still needs to be protected from leakage or exposure outside of the trusted enclave 702.

When the framework calls the Compute( ) or Update( ) interfaces of the MatMul OP 604 or Add OP 606, the shadow implementations (604-S or 606-S) of these interfaces call the corresponding real implementations (604-R or 606-R respectively) via the ECALL interface. For example, when the framework calls the shadow interface Compute( ) of MatMul OP, the shadow implementation of this interface in the untrusted execution area 704 calls, via ECALL, the real implementation of Compute( ) of MatMul OP in the trusted enclave 702. The real implementation receives its input from the memory regions which store the parameter $M_2$ and the input $O_1$ to do the real matrix/vector multiplication and save the result inside the trusted enclave 702.

In some embodiments, the real implementation can copy the MatMul computation from the original codebase, for example, the TensorFlow source code. Alternatively, if due to restricted runtime support, the source code cannot run inside the trusted enclave 702, the implementation can be copied from an open-source project (e.g., landoxy).

Only the Compute( ) interface of the Act OP 608 outputs its result to the untrusted execution area 704 during the feed-forward pass. All other OPs save their computation result to the memory inside the trusted enclave 702.

Further, only the Update( ) interface of the Act OP 608 accepts a derivation from the framework during the back-propagation pass so that all customized OPs in the previous layer can calculate the gradients and therefore update their parameters. All other OPs receive their computation input parameter from the memory inside the trusted enclave 702.

Figure 8:
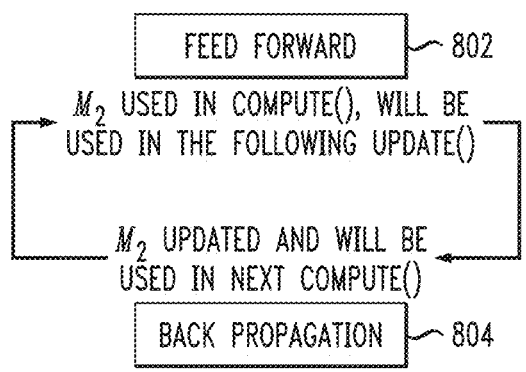
FIG. 8 illustrates feedforward and backpropagation operations for use in computations associated with one or more layers of an artificial full connection neural network according to an illustrative embodiment.

When the framework calls the GetParameter( ) interfaces of the MatMul OP 604 or Add OP 606, the shadow implementation of these interfaces calls the corresponding real implementation via the ECALL interface, as mentioned above. Then, the real implementation sends the associated parameters ($M_2$ or b2) to the untrusted execution area 704 to be exported to the inference model. For example, the real implementation of the GetParameter( ) interface of the MatMul OP returns the parameter $M_2$ to the shadow implementation and the shadow implementation sends it to the framework so that the framework can save it into the pre-trained model. In some embodiments, there is special processing for all GetParameter( ) interfaces: (i) only parameters after Update( ) can be exposed to outside trusted enclave 702 via the GetParameter( ) interface, i.e., not the parameters after Compute( ) but before Update( ) and (ii) after the parameters have been exposed via GetParameter( ) no further training is accepted. FIG. 8 illustrates why such decisions are implemented.

More particularly, FIG. 8 illustrates a process 800 with a feedforward operation 802 and a backpropagation operation 804 according to an illustrative embodiment. While FIG. 8 depicts feedforward and backpropagation operations with respect to the $M_2$ parameter, it is to be understood that the same or similar processing occurs for the $b_2$ parameter. In feedforward operation 802, $M_2/b_2$ are used in Compute( ) to calculate the current $O_2$ and therefore should not be exposed, else with $O_2$ being exposed and if $M_2/b_2$ are known, $O_1$ can be deduced. In backpropagation operation 804, $M_2/b_2$ are different from $M_2/b_2$ in feedforward operation 802 as they have been changed in the Update( ) interface. So even with these values being exposed and with $O_2$ being known, $O_1$ still cannot be deduced. After $M_2/b_2$ are exposed, no other Compute( ) interface should be called because these updated $M_2/b_2$ will be used in Compute( ) in the next feedforward pass to calculate the next $O_2$. With this updated $M_2/b_2$ and the next $O_2$ exposed, the next $O_1$ can be deduced.

Accordingly, as explained herein, illustrative embodiments provide an effective and secure solution to protect user raw data samples. More particularly, illustrative embodiments provide for deploying a sub-model which comprises just a few layers at the beginning of the model (e.g., initial two layers) into a trusted enclave of a TEE platform, and for decrypting the encrypted user data samples inside the enclave with a key provisioned during runtime. This solution is very effective because encryption/decryption occurs only once. Unlike homomorphic encryption, which executes all computations on the encrypted data, solutions according to illustrative embodiments encrypt/decrypt the data only once and all training computations are executed upon the clear-text data. Also, only a few layers of the model are put into the enclave. Unlike landoxy, which puts the entire model inside the enclave with a major performance penalty, solutions according to illustrative embodiments only put a few layers into the enclave so the performance can be improved. Still further, illustrative embodiments can be easily integrated into current cloud/edge computing infrastructure. Unlike federate learning, solutions according to illustrative embodiments can reuse the current deep learning framework and cloud computing infrastructure without any extra resources more than current industry solutions, and it can be very easily implemented and deployed.

In addition, unlike all solutions which cannot leverage accelerators, solutions according to illustrative embodiments can support accelerators. Although a part of the model is inside the enclave and therefore cannot be accelerated, the major part of the model outside the enclave can be executed on GPUs, TPUs, etc. Although there is some added overhead in solutions according to illustrative embodiments due to introducing extra function calls between the shadow implementations in the untrusted part and the real implementations in the trusted part of the customized OP. However, this overhead is acceptable since, in some embodiments, only six extra function calls are introduced and in feedforward and backpropagation iterations in a deep learning network, typically there are hundreds or even thousands of function calls.

Solutions according to illustrative embodiments are secure because: (i) they use an enclave to make sure the customized OP implementation cannot be tampered with by other parties; (ii) they enable the data owner to encrypt their data and only provision secrets to the attested parties; and (iii) the key/secret exchange is via a secured channel established during attestation.

Illustrative embodiments provide an effective and flexible implementation to exchange data between the enclave and the untrusted environment outside the enclave. Although there are many ways to exchange data between the enclave and the outside untrusted world (for example, model parallelism), illustrative embodiments provide a very effective and flexible way to use customized OPs to implement the data exchange transparently to the application operator and the data owner. Furthermore, deep learning frameworks support customized Ops and all customized OP implementations can be dynamically created and registered into the framework without any change of the framework codebase. Also, advantageously, the behavior of the customized OP is transparent to the framework. As such, solutions according to illustrative embodiments can easily and seamlessly be integrated into current industry deep learning frameworks and TEE platforms.

Figure 9:
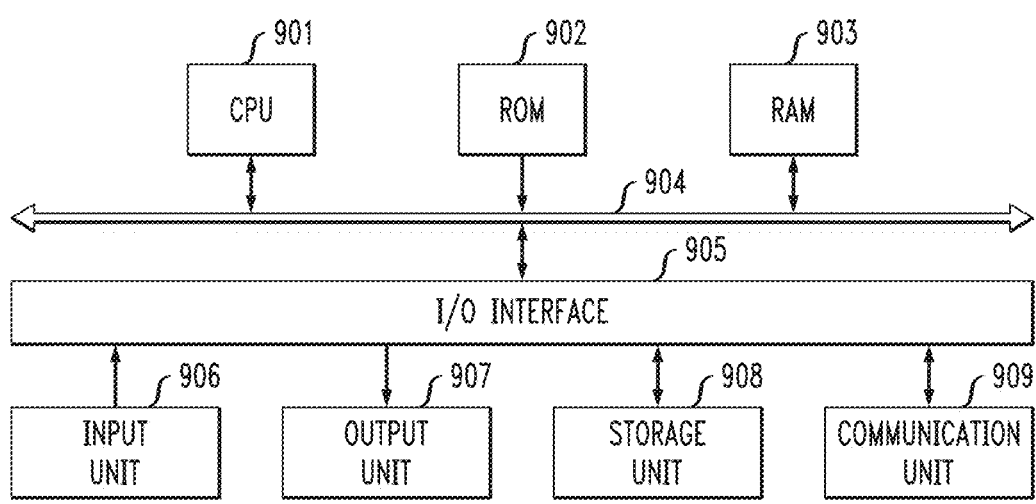
FIG. 9 illustrates a processing platform used to implement an information processing system with execution environment functionalities for protecting input data samples of an artificial intelligence model according to an illustrative embodiment.

FIG. 9 illustrates a block diagram of an example processing device or, more generally, an information processing system 900 that can be used to implement illustrative embodiments. For example, one or more components in FIGS. 1-8 can comprise a processing configuration such as that shown in FIG. 9 to perform steps described herein. Note that while the components of system 900 are shown in FIG. 9 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 900 can include multiple processing devices, each of which comprise the components shown in FIG. 9.

As shown, the system 900 includes a central processing unit (CPU) 901 which performs various appropriate acts and processing, based on a computer program instruction stored in a read-only memory (ROM) 902 or a computer program instruction loaded from a storage unit 908 to a random access memory (RAM) 903. The RAM 903 stores therein various programs and data required for operations of the system 900. The CPU 901, the ROM 902 and the RAM 903 are connected via a bus 904 with one another. An input/output (I/O) interface 905 is also connected to the bus 904. It is to be appreciated that component 901 in FIG. 9 can alternatively or additionally represent an accelerator such as, but not limited to, a TPU, a GPU, and combinations thereof.

The following components in the system 900 are connected to the I/O interface 905, comprising: an input unit 906 such as a keyboard, a mouse and the like; an output unit 907 including various kinds of displays and a loudspeaker, etc.; a storage unit 908 including a magnetic disk, an optical disk, and etc.; a communication unit 909 including a network card, a modem, and a wireless communication transceiver, etc. The communication unit 909 allows the system 900 to exchange information/data with other devices through a computer network such as the Internet and/or various kinds of telecommunications networks.

Various processes and processing described above may be executed by the CPU 901. For example, in some embodiments, methodologies described herein may be implemented as a computer software program that is tangibly included in a machine readable medium, e.g., the storage unit 908. In some embodiments, part or all of the computer programs may be loaded and/or mounted onto the system 900 via ROM 902 and/or communication unit 909. When the computer program is loaded to the RAM 903 and executed by the CPU 901, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    executing a first portion of an artificial intelligence model within a trusted execution area of an information processing system and a second portion of the artificial intelligence model within an untrusted execution area of the information processing system, wherein data at least one of obtained and processed in the first portion of the artificial intelligence model is inaccessible to the second portion of the artificial intelligence model;
    wherein a plurality of operations, customizable in accordance with one or more interfaces of a deep learning framework and executed by the information processing system, each comprise one part executable in the trusted execution area and another part executable in the untrusted execution area, and wherein the one part and the other part of each of the plurality of operations communicate via one or more calls between the trusted execution area and the untrusted execution area;
    wherein the plurality of operations is computed with a feedforward pass prior to calculating gradients and updating parameters of the plurality of operations based on the computed plurality of operations in a backpropagation pass;
    wherein the plurality of operations comprise:
        a first operation configured to assign the at least one of obtained and processed data into a first layer of the trusted execution area;
        a second operation configured to compute a first parameter associated with the feedforward pass, to update the first parameter based on the calculated gradients during the backpropagation pass, and to export the first parameter from the first portion of the artificial intelligence model to the second portion of the artificial intelligence model;
        a third operation configured to compute a second parameter associated with the feedforward pass, to update the second parameter based on the calculated gradients during the backpropagation pass, and to export the second parameter from the first portion of the artificial intelligence model to the second portion of the artificial intelligence model; and
        a fourth operation configured to compute an activation function during the feedforward pass and to send its gradient to the third operation during the backpropagation pass; and
    wherein the information processing system comprises at least one processor and at least one memory storing computer program instructions wherein, when the at least one processor executes the computer program instructions, the information processing system performs the method.

2. The method of claim 1, further comprising obtaining data in the trusted execution area, wherein the obtained data comprises one or more data samples in an encrypted form usable to train the artificial intelligence model.

3. The method of claim 2, further comprising obtaining at least one secret in the trusted execution area, wherein the at least one secret is useable to convert the one or more data samples into a decrypted form within the trusted execution area.

4. The method of claim 3, wherein the artificial intelligence model comprises a network wherein the first portion of the artificial intelligence model comprises a first set of layers of the network and the second portion of the artificial intelligence model comprises a second set of layers of the network.

5. The method of claim 4, wherein the first set of layers comprises initial layers of the network and the second set of layers comprises remaining layers of the network.

6. The method of claim 4, further comprising:
processing the one or more data samples in the decrypted form in the first set of layers of the network within the trusted execution area;
generating, based on the processing, an output of the trusted execution area; and
sending the output to the untrusted execution area wherein, given the output, the one or more data samples in the decrypted form and one or more model parameters generated by the first set of layers of the network are inaccessible to the untrusted execution area.

7. The method of claim 1, wherein the one part of each of the plurality of operations has access to the data at least one of obtained and processed in the first portion of the artificial intelligence model, while the data is inaccessible to the other part of each of the plurality of operations.

8. The method of claim 1, wherein the plurality of operations comprise at least one of an input operation, a matrix multiplication operation, an addition operation, and an activation operation.

9. A system, comprising:
a trusted execution area; and
an untrusted execution area operatively coupled to the trusted execution area,
wherein the trusted execution area is configured to execute a first portion of an artificial intelligence model and the untrusted execution area is configured to execute a second portion of the artificial intelligence model, wherein data at least one of obtained and processed in the first portion of the artificial intelligence model is inaccessible to the second portion of the artificial intelligence model;
wherein a plurality of operations, customizable in accordance with one or more interfaces of a deep learning framework and executed by the system, each comprise one part executable in the trusted execution area and another part executable in the untrusted execution area, and wherein the one part and the other part of each of the plurality of operations communicate via one or more calls between the trusted execution area and the untrusted execution area;
wherein the plurality of operations is computed with a feedforward pass prior to calculating gradients and updating parameters of the plurality of operations based on the computed plurality of operations in a backpropagation pass; and wherein the plurality of operations comprise:
a first operation configured to assign the at least one of obtained and processed data into a first layer of the trusted execution area;
a second operation configured to compute a first parameter associated with the feedforward pass, to update the first parameter based on the calculated gradients during the backpropagation pass, and to export the first parameter from the first portion of the artificial intelligence model to the second portion of the artificial intelligence model;
a third operation configured to compute a second parameter associated with the feedforward pass, to update the second parameter based on the calculated gradients during the backpropagation pass, and to export the second parameter from the first portion of the artificial intelligence model to the second portion of the artificial intelligence model; and
a fourth operation configured to compute an activation function during the feedforward pass and to send its gradient to the third operation during the backpropagation pass.

10. The system of claim 9, wherein the trusted execution area is further configured to obtain data, wherein the obtained data comprises one or more data samples in an encrypted form usable to train the artificial intelligence model.

11. The system of claim 10, wherein the trusted execution area is further configured to obtain at least one secret, wherein the at least one secret is useable to convert the one or more data samples into a decrypted form within the trusted execution area.

12. The system of claim 11, wherein the artificial intelligence model comprises a network wherein the first portion of the artificial intelligence model comprises a first set of layers of the network and the second portion of the artificial intelligence model comprises a second set of layers of the network.

13. The system of claim 12, wherein the first set of layers comprises initial layers of the network and the second set of layers comprises remaining layers of the network.

14. The system of claim 12, wherein the trusted execution area is further configured to:
process the one or more data samples in the decrypted form in the first set of layers of the network;
generate an output based on the processing; and
send the output to the untrusted execution area wherein, given the output, the one or more data samples in the decrypted form and one or more model parameters generated by the first set of layers of the network are inaccessible to the untrusted execution area.

15. The system of claim 9, wherein the one part of each of the plurality of operations has access to the data at least one of obtained and processed in the first portion of the artificial intelligence model, while the data is inaccessible to the other part of each of the plurality of operations.

16. A computer program product stored on a non-transitory computer-readable medium and comprising machine executable instructions, the machine executable instructions, when executed, causing a processing device to:
execute a first portion of an artificial intelligence model within a trusted execution area of an information processing system and a second portion of the artificial intelligence model within an untrusted execution area of the information processing system, wherein data at least one of obtained and processed in the first portion of the artificial intelligence model is inaccessible to the second portion of the artificial intelligence model;

wherein a plurality of operations, customizable in accordance with one or more interfaces of a deep learning framework and executed by the information processing system, each comprise one part executable in the trusted execution area and another part executable in the untrusted execution area, and wherein the one part and the other part of each of the plurality of operations communicate via one or more calls between the trusted execution area and the untrusted execution area;

wherein the plurality of operations is computed with a feedforward pass prior to calculating gradients and updating parameters of the plurality of operations based on the computed plurality of operations in a backpropagation pass; and wherein the plurality of operations comprise:
- a first operation configured to assign the at least one of obtained and processed data into a first layer of the trusted execution area;
- a second operation configured to compute a first parameter associated with the feedforward pass, to update the first parameter based on the calculated gradients during the backpropagation pass, and to export the first parameter from the first portion of the artificial intelligence model to the second portion of the artificial intelligence model;
- a third operation configured to compute a second parameter associated with the feedforward pass, to update the second parameter based on the calculated gradients during the backpropagation pass, and to export the second parameter from the first portion of the artificial intelligence model to the second portion of the artificial intelligence model; and
- a fourth operation configured to compute an activation function during the feedforward pass and to send its gradient to the third operation during the backpropagation pass.

17. The computer program product of claim 16, wherein the trusted execution area is further configured to obtain data, wherein the obtained data comprises one or more data samples in an encrypted form usable to train the artificial intelligence model.

18. The system of claim 9, wherein the customizable plurality of operations comprise at least one of an input operation, a matrix multiplication operation, an addition operation, and an activation operation.

19. The computer program product of claim 16, wherein the customizable plurality of operations comprise at least one of an input operation, a matrix multiplication operation, an addition operation, and an activation operation.

20. The computer program product of claim 16, wherein the one part of each of the plurality of operations has access to the data at least one of obtained and processed in the first portion of the artificial intelligence model, while the data is inaccessible to the other part of each of the plurality of operations.

* * * * *